United States Patent [19]
Blea et al.

[11] Patent Number: 5,778,393
[45] Date of Patent: Jul. 7, 1998

[54] ADAPTIVE MULTITASKING FOR DATASET STORAGE

[75] Inventors: Donald Reynold Blea; Ronald Maynard Kern; Gregory Edward McBride; David Michael Shackelford, all of Tucson, Ariz.

[73] Assignee: International Business Machines Corporation, Armonk, N.Y.

[21] Appl. No.: 650,606

[22] Filed: May 20, 1996

[51] Int. Cl.⁶ .................................................. G06F 17/30
[52] U.S. Cl. ............................................ 707/205; 707/200
[58] Field of Search ........................ 395/601, 611, 395/616, 617, 618, 619, 620, 621, 622; 707/1, 100, 200, 201, 202, 203, 204, 205, 206

[56] References Cited

U.S. PATENT DOCUMENTS

| | | | |
|---|---|---|---|
| 4,587,628 | 5/1986 | Archer et al. | 364/900 |
| 5,131,087 | 7/1992 | Warr | 395/440 |
| 5,193,184 | 3/1993 | Belsan et al. | 395/600 |
| 5,333,299 | 7/1994 | Koval et al. | 395/550 |
| 5,379,412 | 1/1995 | Eastridge et al. | 395/575 |
| 5,404,510 | 4/1995 | Smith et al. | 395/602 |
| 5,485,610 | 1/1996 | Gioielli et al. | 395/613 |
| 5,490,260 | 2/1996 | Miller et al. | 395/427 |
| 5,627,995 | 5/1997 | Miller et al. | 395/497.02 |
| 5,652,879 | 7/1997 | Harris et al. | 395/612 |

*Primary Examiner*—Thomas G. Black
*Assistant Examiner*—Ruay Lian Ho
*Attorney, Agent, or Firm*—Baker Maxham Jester & Meador

[57] ABSTRACT

Data is stored in one or more data storage devices, the number of active data storage devices being adaptively adjusted to maximize parallelism while minimizing device overhead. Multiple datasets are first received, these being designated for storage in multiple data storage devices. Next, a first one of the received datasets is stored in a first one of the data storage devices. Concurrently with storage of the first dataset, the following steps are performed: (1) selecting a second received dataset from those remaining to be stored, (2) selecting an available data storage device by employing a predetermined criteria, and (3) beginning storage of the second dataset in the selected data storage device. The predetermined criteria for selecting an available data storage device may involve, for example, selecting an available device based on a "first fit" or a "best fit" scheme. Concurrently with storage of the second dataset, storage of a third dataset starts. Likewise, the process of storing each subsequent dataset commences while the previous dataset is being stored. This technique promotes efficiency, since later-received datasets may be stored in previously used storage devices that have already finished storing earlier datasets. Accordingly, less processing overhead is occupied in activating previously dormant data storage devices.

42 Claims, 4 Drawing Sheets

ADAPTIVE MULTITASKING FOR DATASET STORAGE

BACKGROUND OF THE INVENTION

1. Field of the Invention

The present invention relates to the storage of datasets using multiple data storage devices. More particularly, the invention concerns a method, apparatus, and article of manufacture used to store datasets in one or more data storage devices, where the number of data storage devices is adaptively adjusted to maximize parallelism while minimizing device overhead.

2. Description of the Related Art

Most large digital data storage systems write data to a primary storage "volume" comprised of multiple data storage devices. One of the most common ways to write data to multiple devices is to "stripe" the data across the devices. To stripe data, the data is first divided into segments. Then, each segment is individually stored on a selected data storage device. The data storage devices are often selected according to a predetermined order, such as a rotation among the data storage devices.

In a system with five data storage devices, for example, a first data segment is be stored on the first device, the second data segment on the second device, and so on. The sixth data segment is stored on the first device, where the rotation begins anew.

Striping provides a number of benefits, such as increased write parallelism and reduced vulnerability to loss of a data storage device. Due to these and other benefits, many users may be satisfied with the use of conventional data storage systems. Nonetheless, striping may not be exactly suited to certain applications. In particular, efficiency suffers when allstorage devices are always employed to store incoming data that could be stored on a lesser number of storage devices. Each activation of a storage device requires a certain amount of processor time. In a typical MVS-based system, such as the IBM S/390, activating a storage device requires about 10,000 machine instructions, each lasting between 10–100 ms. Therefore, it is not efficient to blindly activate all storage devices when data could be consolidated on a smaller number of devices.

In the above example, all five storage devices are always invoked to store five segments of data. This is done under the assumption that the incoming data is sufficiently large to activate all data storage devices. This assumption is frequently wrong. In some cases, for example, it may be possible to store two smaller segments on one storage device rather than two devices.

On the other hand, using too few storing devices is also inefficient. Storing all data on one storage device, for example, causes a significant delay when the amount of data is substantial. This procedure is efficient in terms of the processor time required to activate data storage devices, however, since the minimum number of devices is activated. Accordingly, a balance must be reached between activating too many devices (wasting processor overhead to activate the devices) and activating too few devices (delaying the storage of data).

SUMMARY OF THE INVENTION

Broadly, the present invention concerns the storage of data in one or more data storage devices, where the number of data storage devices is adaptively adjusted to maximize parallelism while minimizing device overhead. In one embodiment, the invention may be implemented to provide a method for operating a digital computing system to store data using multiple data storage devices.

Multiple datasets are first received, these being designated for storage in multiple data storage devices. Next, a first one of the received datasets is stored in a first one of the data storage devices. Concurrently with storage of the first dataset, the following steps are performed: (1) selecting a second received dataset from those remaining to be stored, (2) selecting an available data storage device by employing a predetermined criteria, and (3) beginning storage of the second dataset in the selected data storage device. The predetermined criteria for selecting an available data storage device may involve, for example, selecting an available device based on a "first fit" or a "best fit" scheme.

Concurrently with storage of the second dataset, storage of a third dataset starts. Likewise, the process of storing each subsequent dataset commences while the previous dataset is being stored. Accordingly, the invention employs multitasking to concurrently store datasets, this multitasking being adaptive since additional data storage devices are only used "as needed". This technique promotes efficiency, since later-received datasets may be stored in previously used storage devices that have already finished storing earlier datasets. Accordingly, less processing overhead is occupied since the same devices can be used again without the penalty of startup overhead.

In a different embodiment, the invention may be implemented to provide an apparatus comprising a digital computing system with multiple data storage devices, where the digital computing system is programmed to efficiently store multiple datasets in the data storage devices, as described above. In still another embodiment, the invention may be implemented to provide an article of manufacture comprising a data storage medium containing machine-readable instructions for executing methods such as those described above.

The invention affords a number of distinct advantages. For example, the invention minimizes the processor overhead expended in activating data storage devices since data storage devices are only invoked as needed. Furthermore, the invention reduces the waiting time to store data by dividing excessively large blocks of data and distributing their storage among the data storage devices. The invention is therefore useful, for example, in a recovery system of a data storage system, where data is efficiently stored in a journal volume for later use in recovering a failed primary storage volume.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

As broadly stated above, the present invention concerns the storage of data in one or more data storage devices, the number of which is adaptively selected to maximize parallelism while minimizing device overhead.

HARDWARE COMPONENTS AND INTERCONNECTIONS

Figure 1:
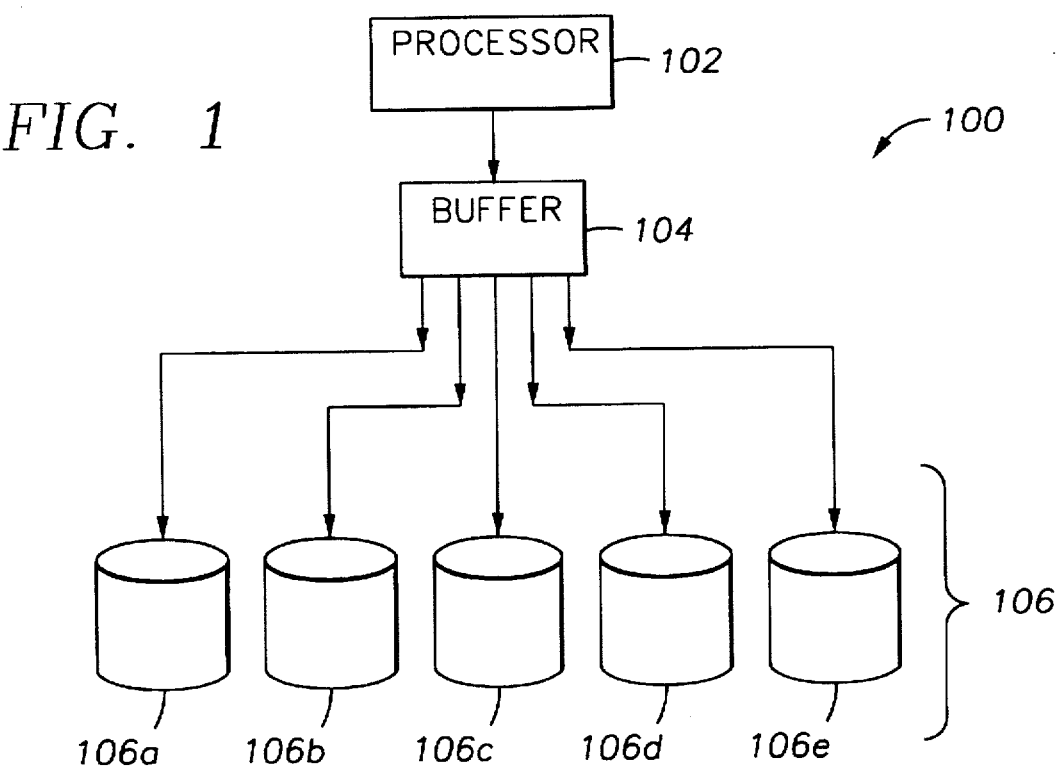
FIG. 1 is a diagram of the hardware components and interconnections of the present invention.

FIG. 1 illustrates one hardware environment of the present invention, involving a digital data storage system 100. More particularly, in the system 100 a processor 102 supervises distribution of data (not shown) from a buffer 104 to a data storage volume 106 comprised of multiple data storage devices 106a–106e. The processor 102 may be coupled to the buffer 104 (as shown) and/or the data storage volume 106, depending upon the particular hardware features selected to embody these components.

The processor 102 comprises a digital data processor, such as a microprocessor, computer, programmable logic array ("PLA"), or another suitable device for performing digital computations. The buffer 104 comprises a nonvolatile storage unit such as a cache or other RAM module. The storage devices 106a–106e comprise direct access storage devices ("DASDs"), such as "hard drives", RAID units, writable optical storage units, magnetic tape devices, or other suitable storage units.

OPERATION

Another aspect of the present invention concerns a method for operating a digital data storage system to store data using multiple data storage devices. For explanatory purposes, this method is described in the context of the hardware components of FIG. 1. When implemented in the system 100, this method may be executed by the processor 102 carrying out a sequence of machine-readable instructions. As mentioned above, the processor 102 may comprise a device controller, host processor, or another suitable digital processing apparatus.

Data Storage Medium

Figure 2:
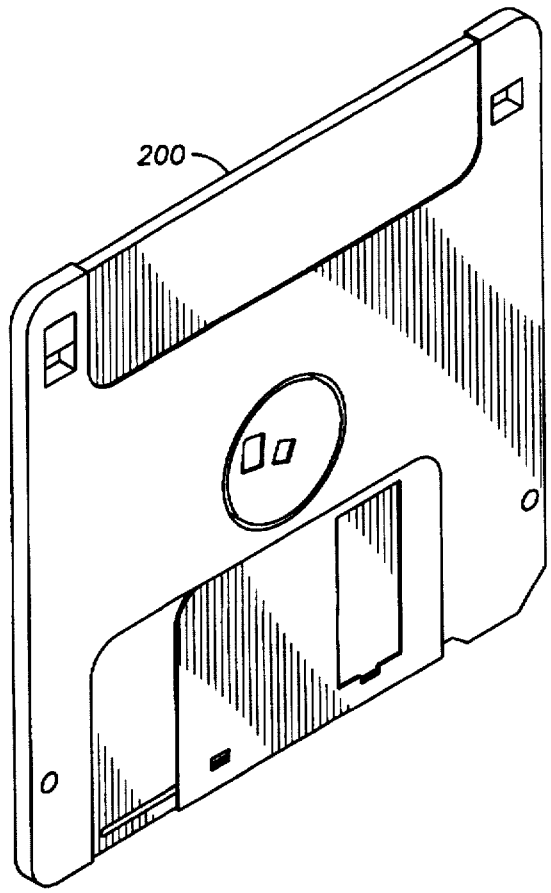
FIG. 2 is a diagram of an article of manufacture comprising a data storage medium in accordance with the invention.

This sequence of machine-readable instructions may reside, for example, in memory (not shown) associated with the processor 102. Alternatively, the instructions may be contained on a data storage medium, such as a computer diskette 200 (FIG. 2). Or, the instructions may also be stored on a DASD array, magnetic tape, conventional "hard drive", electronic read-only memory, optical storage device, paper "punch" cards, or another data storage device. In this regard, one aspect of the present invention is an article of manufacture, comprising a data storage medium embodying such a sequence of instructions.

In an illustrative embodiment of the invention, the machine-readable instructions may comprise lines of compiled PLX language code, where the instructions are executed by a host processor in a mainframe computer such as the IBM model S/390. Alternatively, these instructions may be written in another language, such as C or C++, where they are embodied by microcode of a storage device controller, such as an IBM model 3990-6 controller.

General Operational Sequence

A. Receiving and Evaluating New Data

Figure 3:
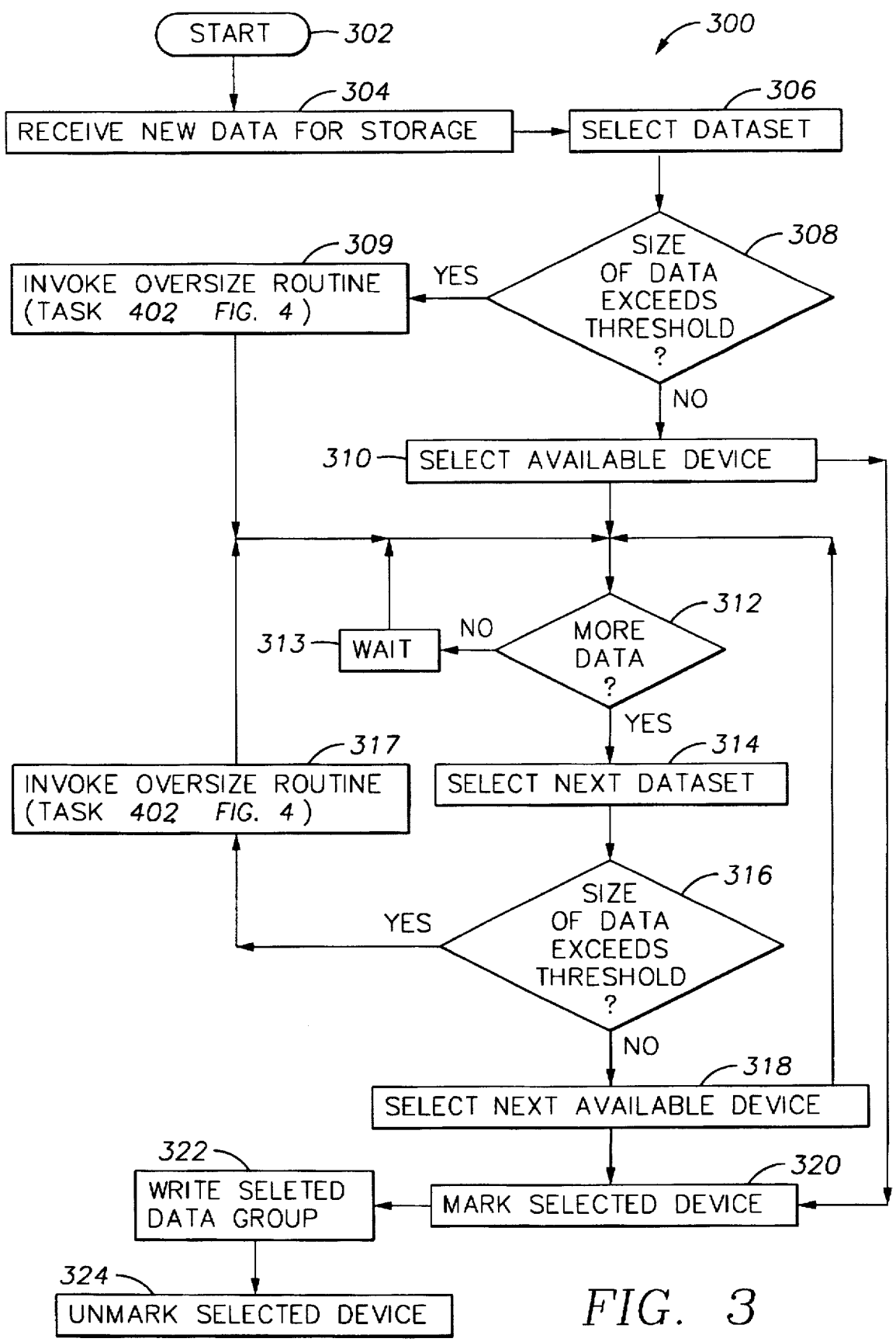
FIG. 3 is a flowchart illustrating a sequence for operating a digital computing system to store data using multiple data storage devices, in accordance with the present invention.

FIG. 3 illustrates an exemplary method in accordance with the invention, represented by a sequence of tasks 300.

The sequence 300 is initiated in task 302, which may be triggered upon receipt of data by the buffer 104, boot-up of the processor 102, or another appropriate event. After task 302, new data is received in the buffer 104 for storage in the volume 106. In the illustrated example, the data includes multiple datasets, received in a particular order. The buffer 104 stores the incoming data in the same order as the data is received, therefore operating as a FIFO buffer.

In task 306, the processor 102 selects one of the datasets received into the buffer 104. To be consistent with the FIFO strategy, the dataset selected in task 306 is preferably the "oldest" dataset remaining in the buffer 104.

Next, task 308 asks whether the size of the selected dataset exceeds a predetermined threshold. If the dataset is too large, it may be more efficient to break the dataset into parts and store the parts concurrently on multiple devices 106a–106e. If the dataset's size exceeds the threshold, task 309 invokes an "oversize routine", which begins in task 402 of FIG. 4 (described below). Otherwise, query 308 directs control to task 310, which selects an available one of the devices 106a–106e to store the selected dataset. A device is "available" if it is not already busy storing another dataset. Available data storage devices therefore may also be referred to as "non-busy", with unavailable data storage devices being "busy". As discussed in greater detail below, when a device begins storing a dataset, the device may be marked, flagged, logged, or otherwise designated as unavailable.

B. Selecting an Available Device

There are a number of different ways to select a data storage device, described as follows. "Selecting" a data storage device may also be referred to as "choosing" an available data storage device, with no difference in meaning.

1. Selection of Devices: First Fit

In one embodiment, an available device may be selected using a "first fit" scheme, in which the next available device is specified by a rotational order among the devices 106a–106e. This may involve: (1) first identifying the available devices and then choosing the next-ordered device, or (2) first choosing the next-ordered device and then determining whether it is available, if not available, proceeding to the next-ordered device and determining whether it is available, etc.

In FIG. 1, for example, the "first fit" order be established as shown in Table 1, below.

TABLE 1

| Exemplary "First Fit" Order | |
| --- | --- |
| SELECTION ORDER | DEVICE |
| 1ST | 106A |
| 2ND | 106B |
| 3RD | 106C |
| 4TH | 106D |
| 5TH | 106E |

2. Selection of Devices: Best Fit

In a different embodiment, an available device may be selected based upon how much available storage space the device has. This technique involves determining how much storage space each of the devices 106a–106e have, and selecting the device containing the least amount of data. As with the first fit scheme, this may be performed in various orders. For example, this may involve: (1) first identifying the available devices and then choosing the emptiest device, or (2) first choosing the emptiest device and then determining whether it is available, if not available, proceeding to the next-emptiest device and determining whether it is available, etc.

C. Storing the Dataset

After the appropriate device is selected in task 310, the process of storing the current dataset in the selected device begins. First, in task 320 the selected device is designated as being "busy", i.e. unavailable. This is achieved by updating a status record which indicates the status of each device 106a–106c as either available or unavailable. As an exemplary implementation, this may involve setting a software flag in memory of the processor 102, updating a stored log of all unavailable devices, or otherwise denoting the selected device as being unavailable.

Following task 320, the selected device writes the new dataset to storage in task 322. After completion of task 322, the selected device is "unmarked" in task 324 to denote the device's availability.

D. Processing Subsequent Datasets

After task 310, processing of other datasets in the buffer 104 begins in query 312. In particular, query 312 asks whether the buffer 104 contains more datasets for storage in the volume 106. Because processing of the next dataset (query 312) begins while the previous dataset is being stored (tasks 320–324), storage using the present invention employs multitasking.

If no more datasets exist in the buffer 104, task 313 waits before query 312 again asks whether the buffer 104 contains any datasets. If query 312 finds one or more datasets in the buffer 104, task 314 selects the next dataset for storage in the volume 106. In the illustrated example, according to the FIFO strategy, the dataset selected in task 314 is the "oldest" dataset remaining in the buffer 104.

After task 314, query 316 asks whether the size of the recently selected dataset exceeds the predetermined threshold. If the dataset's size exceeds the threshold, task 317 invokes the oversize routine at task 402 of FIG. 4 (described below). Otherwise, query 316 directs control to task 318, which selects the next available device, in the same manner as task 310. After task 318, control proceeds to tasks 320–324, for storage of the current dataset in the selected device as discussed above. Also after task 318, query 312 is repeated to determine whether the buffer contains any more datasets to process. If so, processing of the new dataset(s) is initiated; this may occur in parallel with the storage of one or more previous datasets, as discussed above.

Advantageously, then, new datasets can always be processed (tasks 312–318) while prior datasets are being stored (tasks 320–324). In this sense, the invention exhibits multitasking in its data storage. And, since data storage devices are only invoked as needed, selection of data storage devices is adaptive.

Oversize Routine

Figure 4:
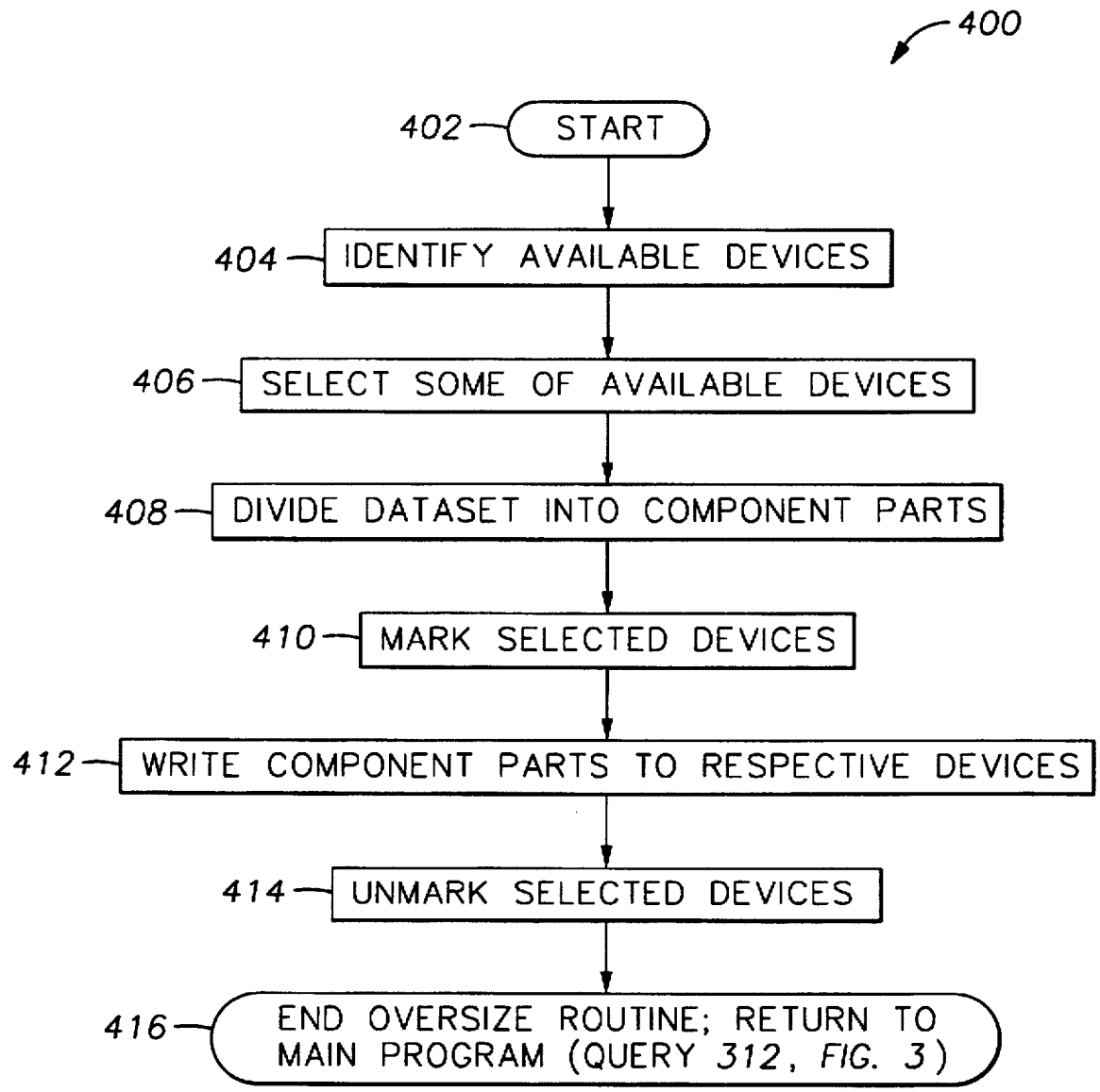
FIG. 4 is a flowchart illustrating an oversized routine for processing especially large datasets.

As explained above in conjunction with FIG. 3 (tasks 309, 317), the oversize routine is performed if the size of an incoming dataset exceeds a predetermined threshold. FIG. 4 describes an exemplary sequence of tasks 400 illustrating one embodiment of oversize routine.

After the routine 400 begins in task 402, task 404 identifies all of the available devices. This may be achieved for example, by determining which devices have not been marked as being busy. Then task 406 selects a number of the available devices for storage of the oversize dataset. Task 406 may, for example, select all available devices, a predetermined number of the available devices, a number of available devices proportional to the size of the dataset, etc. Alternatively, task 406 may select less than all available devices, always leaving a predetermined number of devices available for storage of incoming data. After task 406, task 408 divides the dataset into component parts, one part for each of the selected devices.

Next, task 410 marks the selected devices as being unavailable, and task 412 writes each component of the dataset to its respective device. After task 412 completes, task 414 unmarks the selected devices, designating them as available once again. After task 414, the oversize routine 400 ends in task 416, subsequently jumping back to query 312 (FIG. 3) to check for more incoming data.

EXAMPLE

Figure 5:
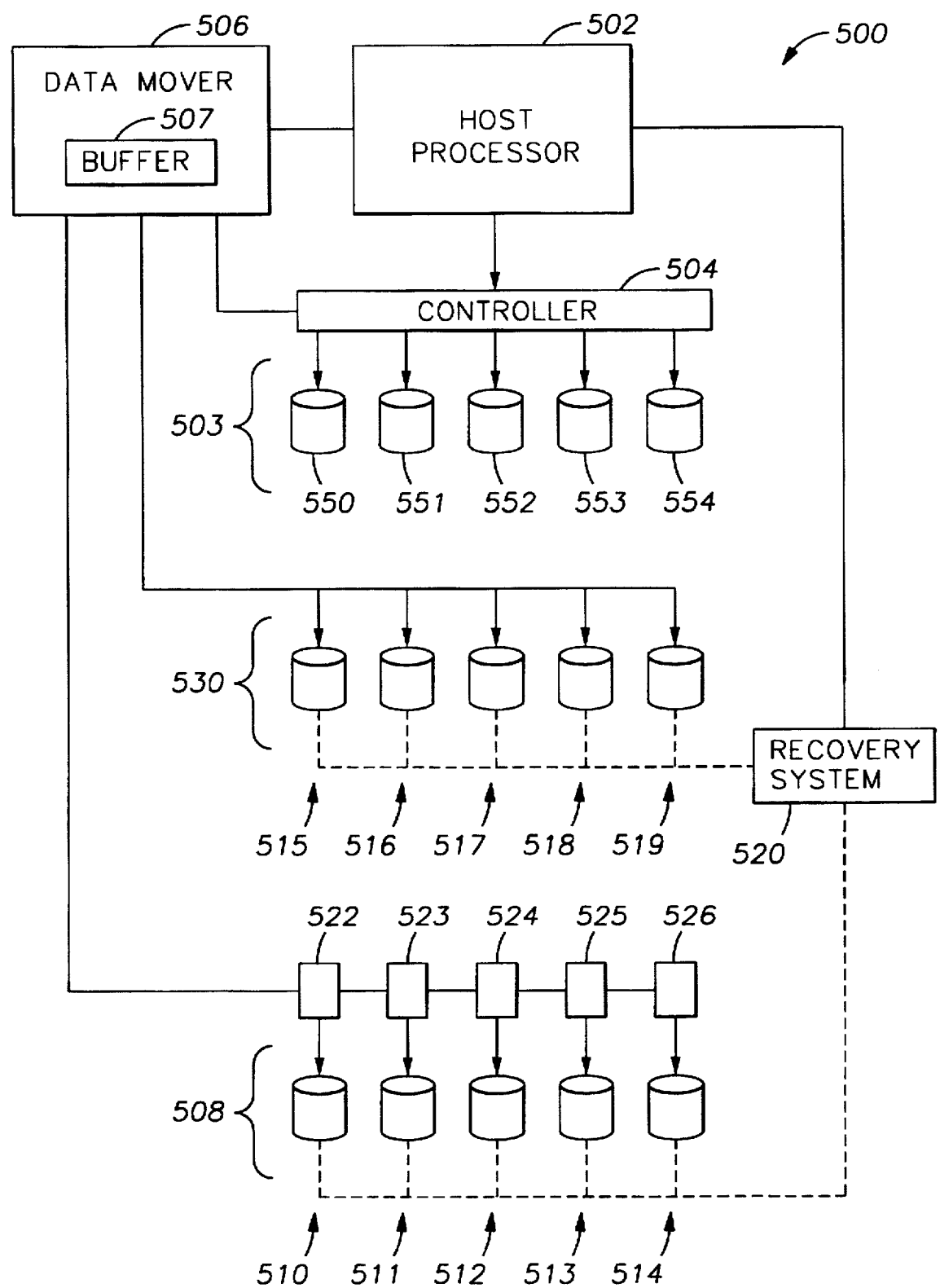
FIG. 5 is a diagram of the hardware components and interconnections of an exemplary implementation of the present invention.

To illustrate an exemplary implementation of the invention, FIG. 5 depicts a data storage system 500 that includes a data recovery facility. The system 500 may be implemented by a mainframe computer such as an IBM model S/390, a personal computer, or another suitable data processing environment. The storage system 500 may employ a custom database program, or a known database program such as IMS, DB2, CICS, or ADABAS. The system 500 includes a host processor 502 coupled to a primary storage volume 503, a data mover 506, and a recovery system 520. The system 500 also includes a secondary storage volume 530 and a journal volume 508, both coupled to the data mover 506.

Generally, the storage system 500 carries out the function of "asynchronous remote copy", where data stored in the primary storage volume 503 is also written to the secondary volume 530 as a backup. In particular, data from the primary volume 503 is first retrieved by the data mover 506 and temporarily stored in the buffer 507, which may comprise cache memory. Data from the buffer 507 is then written to the journal volume 508 as part of a "journaling" or "logging" operation. Subsequently, this data is also written to the secondary volume 530. The operations of journaling and writing to the secondary volume 530 together form a technique referred to as a "two phase commit". If the primary volume 503 fails, most of the contents of the primary volume 503 have already been stored on the secondary volume 530. For any datasets that have not yet been copied to the secondary volume 530, however, the recovery system 520 retrieves these datasets from the journal volume 508 and writes them to the secondary volume 530 accordingly.

Unlike known journaling systems, however, the present invention writes data to the devices 510–514 of the journal volume 508 in accordance with adaptive multitasking techniques, such as those discussed above in conjunction with FIG. 3.

The primary storage 503 includes a controller 504 and multiple data storage devices 550–554, such as DASDs. The devices 510–514 and 515–519 may also comprise DASDs. The DASDs 510–514 of the journal volume 508 may be individually managed by controllers 522–527, such as IBM model 3390 or 3880 type controllers. As an example, DASDs used in the system 500 may comprise IBM brand RAMAC storage devices.

The data mover 506 may comprise, for example, a software module executed by the host processor 502. Alternatively, the data mover 506 may comprise a separate processor, ASIC, or another suitable apparatus. The recovery system 520, like the data mover 506, may comprise a software module or a separate hardware system, depending upon the needs of the application.

The designation of datasets by the data mover 506 may be conducted, for example, in accordance with the selection of "consistency groups" as taught by U.S. patent application Ser. No. 08/199,444, entitled "Remote Data Duplexing", filed on Feb. 22, 1994, and assigned to IBM Corporation. The aforementioned patent application is hereby incorporated by reference in its entirety. In another embodiment, the datasets' sizes may be selected to fit within a range established by predetermined criteria, which may consider the total number of storage devices and the characteristics of these devices, such as the number of bytes contained on each track, the most efficient number of tracks to write in a single operation, etc.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for operating a digital computing system to store data using multiple data storage devices, said method comprising the steps of:
    (a) receiving a plurality of datasets, the plurality of datasets being in an order;
    (b) processing a dataset first in order by:
        choosing a data storage device that is available to satisfy data storage requests; and
        storing the first dataset in the chosen data storage device;
    (c) processing a dataset next in order by performing a sequence of processing steps, said processing steps being initiated during the steps of processing a dataset immediately previous in order, said processing steps comprising:
        selecting a remaining dataset next in order;
        employing a predetermined criteria to select a data storage device that is available to satisfy data storage requests; and
        storing the selected dataset in the selected data storage device; and
    (d) repeating step (c) a predetermined number of times.

2. The method of claim 1, step (d) comprising the steps of repeating step (c) until each of the plurality of datasets has been stored in a data storage device.

3. The method of claim 1, each dataset having at least a predetermined size.

4. The method of claim 1, step (c) further comprising the steps of:
    determining whether the selected dataset exceeds a predetermined size threshold, and
    if so, dividing the selected dataset into a number of sub-components and
    separately processing each sub-component as one of the plurality of datasets.

5. The method of claim 1, the data storage devices having a predetermined order, the steps of employing a predetermined criteria to select a data storage device that is available to satisfy data storage requests comprising the steps of:
    selecting a first data storage device next in order; and
    determining whether the first data storage device is not available to satisfy data storage requests, and if so, selecting a data storage device next in order to the first data storage device.

6. The method of claim 1, the data storage devices having a predetermined order, the steps of employing a predetermined criteria to select a storage device that is available to satisfy data storage requests comprising the steps of:
    identifying data storage devices that are available to satisfy data storage requests; and
    selecting from the identified data storage devices that are available to satisfy data storage requests a data storage device presently next in order.

7. The method of claim 1, the steps of employing a predetermined criteria to select an available data storage device comprising the steps of:
    selecting a data storage device having less occupied storage space than at least one other data storage device.

8. The method of claim 1, further comprising steps of:
    creating a status record indicating whether each of the data storage devices is available or not available to satisfy data storage requests;
    each time storage of a dataset begins in a data storage device, updating the status record to indicate that said data storage device is presently not available to satisfy data storage requests;
    said step of employing a predetermined criteria to select an available data storage device comprising the steps of referencing the status record to identify a data storage device that is available to satisfy data storage requests.

9. The method of claim 1, the order of the plurality of datasets being an order in which the datasets are received.

10. A method of transferring an ordered sequence of datasets from a buffer to multiple data storage devices, comprising the steps of:
    (a) selecting a dataset according to the order and selecting an available data storage device according to a predetermined criteria;
    (b) storing the selected dataset in the selected data storage device;
    (c) substantially concurrently with the storing step, selecting a dataset next in order and choosing a data storage device that is available to satisfy data storage requests according to a predetermined criteria;
    (d) storing the chosen dataset in the chosen data storage device; and
    (e) repeating steps (c) and (d) until all datasets in the sequence have been stored in a data storage device.

11. The method of claim 10, the order of the plurality of datasets being an order in which the datasets are received.

12. The method of claim 10, the data storage devices having a predetermined order, the step of choosing a data storage device that is available to satisfy data storage requests according to a predetermined criteria comprising the steps of:
    (1) determining whether a data storage device next in order is not available to satisfy data storage requests, and if not, choosing said data storage device;
    (2) otherwise, repeating step (1) until a data storage device is chosen.

13. The method of claim 10, the data storage devices having a predetermined order, the step of choosing a data storage device that is available to satisfy data storage requests according to a predetermined criteria comprising the steps of:
    identifying data storage devices that are available to satisfy storage requests; and
    selecting from the identified data storage devices that are available to satisfy data storage requests a data storage device that is available to satisfy data storage requests presently next in order.

14. The method of claim 10, the data storage devices having a predetermined order, the step of choosing a data storage device that is available to satisfy data storage requests according to a predetermined criteria comprising the steps of:

selecting a data storage device having less occupied storage space than at least one other data storage device.

15. An article of manufacture, comprising a data storage medium tangibly embodying a program of machine readable instructions executable by a digital processing apparatus to perform method steps for operating a digital computing system to store data using multiple data storage devices, said method steps comprising the steps of:
(a) receiving a plurality of datasets, the plurality of datasets being in an order;
(b) processing a dataset first in order by:
choosing a data storage device that is available to satisfy data storage requests; and
storing the first dataset in the chosen data storage device;
(c) processing a dataset next in order by performing a sequence of processing steps, said processing steps being initiated during the steps of processing a dataset immediately previous in order, said processing steps comprising:
selecting a remaining dataset next in order;
employing a predetermined criteria to select a data storage device that is available to satisfy data storage requests; and
storing the selected dataset in the selected data storage device; and
(d) repeating step (c) a predetermined number of times.

16. The article of manufacture of claim 15, step (d) comprising the steps of repeating step (c) until each of the plurality of datasets has been stored in a data storage device.

17. The article of manufacture of claim 15, each dataset having at least a predetermined size.

18. The article of manufacture of claim 15, step (c) further comprising the steps of:
determining whether the selected dataset exceeds a predetermined size threshold, and if so, dividing the selected dataset into a number of sub-components and separately processing each sub-component as one of the plurality of datasets.

19. The article of manufacture of claim 15, the data storage devices having a predetermined order, the steps of employing a predetermined criteria to select a data storage device that is available to satisfy data storage requests comprising the steps of:
selecting a first data storage device next in order; and
determining whether the first data storage device is not available to satisfy data storage requests, and if so, selecting a data storage device next in order to the first data storage device.

20. The article of manufacture of claim 15, the data storage devices having a predetermined order, the steps of employing a predetermined criteria to select a storage device that is available to satisfy data storage requests comprising the steps of:
identifying data storage devices that are available to satisfy data storage requests; and
selecting from the identified data storage devices that are available to satisfy data storage requests a data storage device presently next.

21. The article of manufacture of claim 15, the steps of employing a predetermined criteria to select an available data storage device comprising the steps of:
selecting a data storage device having less occupied storage space than at least one other data storage device.

22. The article of manufacture of claim 15, further comprising steps of:

creating a status record indicating whether each of the data storage devices is
available or not available to satisfy data storage requests;
each time storage of a dataset begins in a data storage device, updating the status record to indicate that said data storage device is presently not available to satisfy data storage requests;
said step of employing a predetermined criteria to select an available data storage device comprising the steps of referencing the status record to identify a data storage device that is available to satisfy data storage requests.

23. The article of manufacture of claim 15, the order of the plurality of datasets being an order in which the datasets are received.

24. An article of manufacture, comprising a data storage medium tangibly embodying a program of machine readable instructions executable by a digital processing apparatus to perform method steps for transferring an ordered sequence of datasets from a buffer to multiple data storage devices, said method steps comprising:
(a) selecting a dataset according to the order and selecting an available data storage device according to a predetermined criteria;
(b) storing the selected dataset in the selected data storage device;
(c) substantially concurrently with the storing step, selecting a dataset next in order and choosing a data storage device that is available to satisfy data storage requests according to a predetermined criteria;
(d) storing the chosen dataset in the chosen data storage device; and
(e) repeating steps (c) and (d) until all datasets in the sequence have been stored in a data storage device.

25. The article of manufacture of claim 24, the order of the plurality of datasets being an order in which the datasets are received.

26. The article of manufacture of claim 24, the data storage devices having a predetermined order, the step of choosing a data storage device that is available to satisfy data storage requests according to a predetermined criteria comprising the steps of:
(1) determining whether a data storage device next in order is not available to satisfy data storage requests, and if not, choosing said data storage device;
(2) otherwise, repeating step (1) until a data storage device is chosen.

27. The article of manufacture of claim 24, the data storage devices having a predetermined order, the step of choosing a data storage device that is available to satisfy data storage requests according to a predetermined criteria comprising the steps of:
identifying data storage devices that are available to satisfy data storage requests; and
selecting from the identified data storage devices that are available to satisfy data storage requests a data storage device presently next in order.

28. The article of manufacture of claim 24, the data storage devices having a predetermined order, the step of choosing a non-busy data storage device according to a predetermined criteria comprising the steps of:
selecting a data storage device having less occupied storage space than at least one other data storage device.

29. A digital processing apparatus, comprising:
multiple data storage devices; and a host processor, coupled to the multiple storage devices, to adaptive store data in the multiple data storage devices by performing method steps comprising:

(a) receiving a plurality of datasets, the plurality of datasets being in an order;

(b) processing a dataset first in order by:
choosing a data storage device that is available to satisfy data storage requests; and
storing the first dataset in the chosen data storage device;

(c) processing a dataset next in order by performing a sequence of processing steps, said processing steps being initiated during the steps of processing a dataset immediately previous in order, said processing steps comprising:
selecting a remaining dataset next in order;
employing a predetermined criteria to select a data storage device that is available to satisfy data storage requests; and
storing the selected dataset in the selected data storage device; and (d) repeating step (c) a predetermined number of times.

30. The apparatus of claim 29, step (d) comprising the steps of repeating step (c) until each of the plurality of datasets has been stored in a data storage device.

31. The apparatus of claim 29, each dataset having at least a predetermined size.

32. The apparatus of claim 29, step (c) further comprising the steps of:
determining whether the selected dataset exceeds a predetermined size threshold, and if so, dividing the selected dataset into a number of sub-components and separately processing each sub-component as one of the plurality of datasets.

33. The apparatus of claim 29, the data storage devices having a predetermined order, the steps of employing a predetermined criteria to select a data storage device that is available to satisfy data storage requests comprising the steps of:
selecting a first data storage device next in order; and
determining whether the first data storage device is not available to satisfy data storage requests, and if so, selecting a data storage device next in order to the first data storage device.

34. The apparatus of claim 29, the data storage devices having a predetermined order, the steps of employing a predetermined criteria to select a storage device that is available to satisfy data storage requests comprising the steps of:
identifying data storage devices that are available to satisfy data storage requests; and
selecting from the identified data storage devices that are available to satisfy data storage requests a data storage device presently next in order.

35. The apparatus of claim 29, the steps of employing a predetermined criteria to select an available data storage device comprising the steps of:
selecting a data storage device having less occupied storage space than at least one other data storage device.

36. The apparatus of claim 29, further comprising steps of:
creating a status record indicating whether each of the data storage devices is available or not available to satisfy data storage requests;
each time storage of a dataset begins in a data storage device, updating the status record to indicate that said data storage device is presently not available to satisfy data storage requests;
said step of employing a predetermined criteria to select an available data storage device comprising the steps of referencing the status record to identify a data storage device that is available to satisfy data storage requests.

37. The apparatus of claim 29, the order of the plurality of datasets being an order in which the datasets are received.

38. A digital computing system, comprising:

multiple data storage devices;

a buffer connected to each of the storage devices; and a host processor to transfer an ordered sequence of datasets from the buffer to the multiple data storage devices by performing method steps comprising:

(a) selecting a dataset according to the order and selecting an available data storage device according to a predetermined criteria;

(b) storing the selected dataset in the selected data storage device;

(c) substantially concurrently with the storing step, selecting a dataset next in order and choosing a data storage device that is available to satisfy data storage requests according to a predetermined criteria;

(d) storing the chosen dataset in the chosen data storage device; and (e) repeating steps (c) and (d) until all datasets in the sequence have been stored in a data storage device.

39. The apparatus of claim 38, the order of the plurality of datasets being an order in which the datasets are received.

40. The apparatus of claim 38, the data storage devices having a predetermined order, the step of choosing a data storage device that is available to satisfy data storage requests according to a predetermined criteria comprising the steps of:

(1) determining whether a data storage device next in order is not available to satisfy data storage requests, and if not, choosing said data storage device;

(2) otherwise, repeating step (1) until a data storage device is chosen.

41. The apparatus of claim 38, the data storage devices having a predetermined order, the step of choosing a data storage device that is available to satisfy data storage requests according to a predetermined criteria comprising the steps of:
identifying data storage devices that are available to satisfy data storage requests; and
selecting from the identified data storage devices that are available to satisfy data storage requests a data storage device presently next in order.

42. The apparatus of claim 38, the data storage devices having a predetermined order, the step of choosing a data storage device that is available to satisfy data storage requests according to a predetermined criteria comprising the steps of:
selecting a data storage device having less occupied storage space than at least one other data storage device.

* * * * *

UNITED STATES PATENT AND TRADEMARK OFFICE
CERTIFICATE OF CORRECTION

PATENT NO.   : 5,778,393
DATED        : July 7, 1998
INVENTOR(S)  : Blea et al

It is certified that error appears in the above-indentified patent and that said Letters Patent is hereby corrected as shown below:

Col. 12, lines 32, 34, 45, and 56, please change each occurrence of "apparatus" to --system--.

Signed and Sealed this

Twentieth Day of October, 1998

Attest:

BRUCE LEHMAN

Attesting Officer

Commissioner of Patents and Trademarks